Sept. 13, 1955
J. W. MURRAY
2,717,573
DUAL POINTER INDICATOR
Filed March 3, 1953
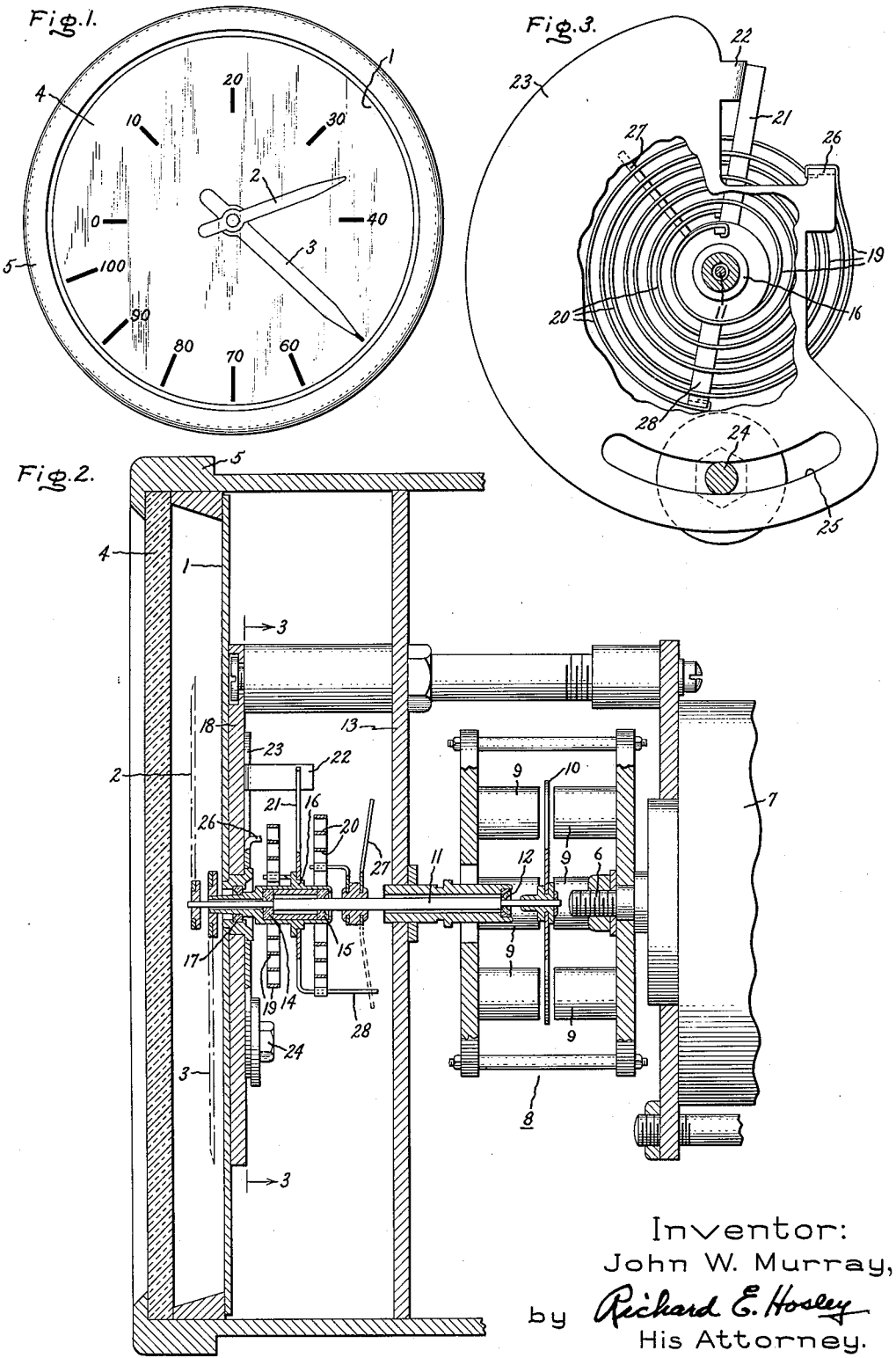
Inventor:
John W. Murray,
by Richard E. Hosley
His Attorney.

United States Patent Office 2,717,573
Patented Sept. 13, 1955

2,717,573
DUAL POINTER INDICATOR

John W. Murray, Marblehead, Mass., assignor to General Electric Company, a corporation of New York Application March 3, 1953, Serial No. 340,103

12 Claims. (Cl. 116—129)

The present invention relates to indicating instruments and, more particularly, to improved indicating means for displaying data with reference to scales having expanded and contracted portions.

In numerous instances, the data communicated by a single instrument pointer cooperating with a single uniformly-distributed circular scale is insufficiently accurate over particularly critical ranges of the scale or fails to make a clear impression of significant information upon the observer. The use of multiple pointers and multiple concentric scales is not alone sufficient to overcome these difficulties effectively. However, these disadvantages are avoided in accordance with this invention, wherein a single circular scale arrangement with relatively expanded and contracted portions is employed together with two concentric-shaft pointers, one of which travels alone over one of the portions of the scale and both of which rotate with the appearance of a single pointer over the other scale portion. Both pointers are actuated by a single angularly-movable shaft, the desired pointer movements being achieved through intermediate stops and spiral springs, one of which springs has a normally-suppressed torque. Particularly advantageous utilization of these concepts is realized in tachometer indicators, such as those having a percentage-speed scale to provide indications responsive to aircraft jet engine speeds.

It is therefore one object of this invention to provide improved instrument indicating mechanisms having at least two pointers angularly movable in cooperation with non-linear scales.

A second object is to provide a novel and improved angularly-movable mechanism having one torque vs. deflection characteristic over one range and a second torque vs. deflection characteristic over another range of angular deflection.

Additionally, it is an object to provide an improved and adjustable dual-characteristic indicating mechanism for tachometer indicators.

By way of a summary account of one aspect of this invention, there are provided two concentric pointer shafts supporting instrument pointers cooperating with an instrument scale, both shafts being driven through spiral springs by a single drive shaft which moves angularly in accordance with the torques imposed upon its eddy-current drag disk by rotating tachometer magnets. The inner pointer shaft is an extension of the drive shaft and rotates with it against the restraining torque of a spiral spring coupled with these shafts at its inner end and with the outer pointer shaft at its outer end. A second spiral spring is coupled with the outer pointer shaft at its inner end and with a stationary frame member at its outer end, this second spring being initially wound to exert a predetermined torque in a direction opposite to that of the drive shaft movements. A stop arm member projecting from the outer pointer shaft abuts an angularly adjustable stop tab affixed to a stationary frame member to maintain the suppressed spring torque, and an additional stop member projects from the drive shaft to contact a stop tab on the outer pointer shaft when a predetermined angular travel of the drive shaft is exceeded. With this arrangement, the drive shaft moves the inner pointer against the first spring torque through a given angular range, the first spring having its outer end fixed stationary because of the opposing force of the second, restrained, spring. Beyond this range, the first spring is completely by-passed due to the contact between the stop arm on the drive shaft and the stop tab on the outer pointer shaft, whereby the restraining torque is that of the suppressed spring alone. The two ranges of pointer movement thus involve different restraining torque characteristics, which are adjustable with the stop arm and stop tab positions.

Although the features of this invention which are believed to be novel are set forth in the appended claims, greater detail of the invention itself and the further objects and advantages thereof may be readily comprehended by reference to the following description taken in connection with the accompanying drawing, wherein:

Figure 1 is a pictorial representation of a dial and pointer arrangement for indicating instruments embodying the teachings of this invention;

Figure 2 depicts a cross-sectional side view of my improved front-end tachometer mechanism; and Figure 3 is an enlarged pictorial view, with portions broken away, illustrating the spring, stop, and adjusting elements of the tachometer mechanism of Figure 2.

The portrayal of indications which the present invention is uniquely adapted to establish is represented in Figure 1, wherein a scale plate 1 cooperates with a pair of concentrically mounted pointers, 2 and 3, behind the conventional instrument window 4 and within the usual front flange 5. The smaller of these pointers, 2, mounted on the inner of two concentric pointer shafts, is read against the indicia 6 extending over a circular arc of about 225 degrees although graduated to include numerically more than half of the scale data, the data being 0–50% engine speed in the preferred embodiment in an engine speed tachometer indicator. Larger pointer 3 rests in the up-scale position illustrated until overtaken by pointer 2, whereupon the superimposed pointers, presenting the appearance of only a single pointer, travel together over the remaining portion of the scale covering an arc of about 125 degrees but conveying 50–100% engine speed data. Thus, when engine speed is less than 50% of the maximum, two pointers are visible in the observer's glance, and the lower range expanded scale further provides accurate indications of such speed for more studied appraisal. With engine speeds of 50% or more, indications are afforded by the superimposed pointers, which make a distinctive impression, and the data having less significance in its incremental variations is adequately represented in cooperation with a relatively contracted scale portion.

My preferred mechanism for embodying the invention in a tachometer indicator having a visible output such as that of Figure 1 appears in the cross-sectional view in Figure 2, corresponding parts being identified by the same reference characters in these two views. Figure 3 presents a front view of certain elements of the instrument taken along line 3—3 of Figure 2. Indications are derived responsive to the speed of the output shaft 6 of a synchronous motor 7, the three phase power excitation for this motor being transmitted from a tachometer generator, not illustrated, which produces a power output having a frequency proportional to the speed of a jet engine or other rotating apparatus to which the generator is attached. A magnet assembly 8, comprising oppositely disposed sets of permanent magnet 9, is rotated by motor 7, and an eddy-current drag disk 10 positioned in the small airgap between the magnet sets is urged to rotate in the same angular direction as the magnets. Disk 10 is attached to the main indicator shaft 11 which is rotatably supported at one end by a jewel bearing 12 mounted with the instrument frame bracket 13 and, near the other end, by jewel bearings 14 and 15 coupling the main shaft to the outer pointer shaft 16 and by the jewel bearing 17 coupling the outer pointer shaft with the dial frame bracket 18.

The outer end of main indicator shaft 11 also functions as the inner pointer shaft, supporting the smaller pointer 2 for angular movement in front of the dial plate 1 and larger pointer 3. Pointer 3 is positioned intermediate the dial plate and smaller pointer, and is mounted on one end of the outer pointer shaft 16 which, as heretofore mentioned, is concentric with the inner shaft 11. Jewels 14 and 15 between the two concentric shafts permit low-friction relative shaft rotation, and outer jewel 17 provides further low-friction support for both shafts.

Resilient restraints for the pointer shafts are provided by the spiral springs 19 and 20, both of which exert torques in an angular direction opposite to that in which the drag disk 10 tends to deflect shaft 11. In the instrument embodiment shown in Figures 1 and 2, the pointers as viewed in Figure 1 are urged clockwise, by the drag disk moving in that same angular direction, such that springs 19 and 20 are arranged to exert opposing torques counterclockwise. Because the larger pointer 3 is to remain stationary at the down scale end of the upper contracted portion of the circular scale, its pointer shaft 16 has projecting therefrom a stop arm 21 which engages a stop tab 22 on a frame-mounted bracket 23 to prevent downscale travel of pointer 3 beyond the intended distance. Bracket 23 may be attached to the instrument frame in any convenient manner, although it is illustrated secured to the frame member 18 by a fastening bolt 24 and angularly adjustable about the pointer shafts because of the limited freedom of movement afforded between the bracket and bolt by the elongated bracket slot 25, seen in Figure 3.

Spiral spring 19 is attached to a second tab, 26, on adjustable bracket 23 at its outer end, the inner end of this spring being fixed to an arm projecting from the outer pointer shaft 16. A suppressed torque is introduced by deflecting stop arm 21 beyond the stop tab 22 and winding the spring 19; thereafter, the stop arm and tab are allowed to engage and the larger pointer 3 is spring-biased to the normal mid-scale position it occupies when not otherwise actuated. Fine adjustment of the suppressed or pre-loaded spring torque is accomplished by angular setting of bracket 23, and fine adjustment of the stop by bending of stop tab 22. Upscale motion of pointer 3 occurs only after main shaft 11 has been rotated beyond an angular position at which an actuating arm 27 attached to the main shaft 11 engages and drives a contact arm 28 attached to the outer pointer shaft 16. Either or both of these arms are adjustable, by bending, to fix the angular position at which the main shaft begins to move the pointer 3.

Spiral spring 20, coupled with main shaft 11 at its inner end and with outer pointer shaft 16 at its outer end, exerts torques restraining movement of the main shaft and inner pointer 2 until arms 27 and 28 engage, the dotted lines 29 in Figure 2 representing this condition. Arm 28 and the outer end of spring 20 are stationary in relation to shaft 11 until such engagement occurs, due to the effects of the suppressed torque in spring 19. After the arms 27 and 28 have engaged, the two pointers are in a superimposed relationship and are restrained solely by spring 19, spring 20 being by-passed.

Attention is drawn to the fact that the indicating mechanism of this invention is not limited to use in dual pointer type instruments. By way of illustration, conventional electrical pick-off devices may be actuated by the relative movements between elements of the mechanism, to provide electrical signals characterizing these movements. Further, the instrument pointer actuated by the outer concentric shaft may be omitted in some instruments not requiring dual pointers. Devices other than tachometers obviously may embody the invention, as, for example, ammeters and voltmeters on which dual characteristic scale portions are desirable. Numerous mechanical changes, in the shaft and pointer arrangements, in the means for introducing adjustments, and in the torque characteristics and scale distributions, may be readily utilized by those skilled in the art. The two movable shafts may of course be other than concentric.

It should thus be apparent that the specific embodiments of this invention disclosed herein are of a descriptive rather than a limiting nature and that various changes, combinations, substitutions, or modifiactions, may be employed in accordance with these teachings without departing in spirit or scope from this invention in its broader aspects.

What I claim as new and desire to secure by Letters Patent of the United States is:

1. A resilient angular restraining arrangement for a first angularly movable shaft, comprising stationary means supporting said shaft for angular movement, a second shaft supported for angular movement in relation to said first shaft and said stationary means, first resilient means angularly restraining movement of said first shaft in relation to said second shaft, and second resilient means exerting a predetermined minimum suppressed torque between said second shaft and said stationary means and angularly restraining movement of said second shaft in relation to said stationary means.

2. A resilient angular restraining arrangement for a first angularly movable shaft, comprising stationary means supporting said shaft for angular movement, a second shaft supported for angular movement in relation to said first shaft and said stationary means, first resilient means angularly restraining movement of said first shaft in relation to said second shaft, an actuating member mounted for angular movement with said first shaft, a cooperating contact member mounted for angular movement with said second shaft, said members being positioned to engage when said first shaft moves through a predetermined angle from a given orientation, and second resilient means angularly restraining movement of said second shaft in relation to said stationary means.

3. A resilient angular restraining arrangement for a first angularly movable shaft, comprising stationary means supporting said shaft for angular movement, a second shaft supported for angular movement in relation to said first shaft and said stationary means, first resilient means angularly restraining movement of said first shaft in relation to said second shaft, second resilient means angularly restraining movement of said second shaft in relation to said stationary means, a stop member mounted in a fixed relationship with said stationary means, and a cooperating stop member mounted for angular movement with said second shaft, said second resilient means exerting a predetermined minimum torque between said second shaft and said stationary means and tending to maintain said stop members in an abutting relationship.

4. A resilient angular restraining arrangement for a first angularly movable shaft, comprising stationary means supporting said shaft for angular movement, a second shaft supported for angular movement in relation to said first shaft and said stationary means, first resilient means angularly restraining movement of said first shaft in relation to said second shaft, an actuating member mounted for angular movement with said first shaft, stop means mounted for angular movement with said second shaft, said actuating member and stop means being disposed to engage when said first shaft moves through a predetermined angle from a given orientation, second resilient means angularly restraining movement of said second shaft in relation to said stationary means, and a stationary stop member mounted in a fixed relationship with said stationary means, said stationary stop member and said second shaft stop means being disposed to engage and being urged into an abutting relationship by torque exerted by said second resilient means.

5. A resilient angular restraining arrangement as set forth in claim 4 wherein said second shaft is mounted concentric with said first shaft, and further comprising means measuring angular deflections of said first shaft.

6. A resilient angular restraining arrangement for an angularly deflecting shaft, comprising stationary means supporting said shaft for angular deflection, first resilient restraining means having a predetermined suppressed torque therein and actuatable to exert restraining torques about the axis of said shaft when the deflecting torque on said shaft exceeds said suppressed torque, and second resilient restraining means coupled to exert torques between said stationary means and shaft.

7. A resilient angular restraining arrangement for an angularly movable shaft, comprising stationary means supporting said shaft for angular movement, first resilient restraining means having a fixed end and a movable end supported by one of said stationary means and shaft with said movable end stopped in a position maintaining a predetermined suppressed loading in said restraining means, and second resilient restraining means having one end supported by the other of said stationary means and shaft and having the other end disposed to deflect said movable end of said first restraining means.

8. A resilient angular restraining arrangement for an angularly movable shaft, comprising stationary means supporting said shaft for angular movement, a first spiral spring having one end fixed to one of said stationary means and shaft and another end disposed against a stop on said one of said stationary means and shaft to suppress a predetermined torque in said spring, a second spiral spring having one end fixed to the other one of said stationary means and shaft and having another end disposed to move said other end of said first spring, and means measuring angular movements of said shaft.

9. A resiliently-restrained instrument indicator arrangement comprising an angularly movable actuating shaft, a pointed shaft concentric with said actuating shaft, an instrument frame, bearing means supporting said shafts for relative angular movement and angular movement in relation to said frame, first and second pointers actuated by said actuating and pointer shafts respectively, first resilient means angularly restraining movement between said shafts, and second resilient means angularly restraining movement of said pointer shaft in relation to said frame, one of said resilient means exerting a predetermined and suppressed minimum torque.

10. A resiliently-restrained instrument indicator comprising an angularly movable actuating shaft, a pointer shaft concentric with said actuating shaft, an instrument frame, bearing means supporting said shafts for relative angular movement and angular movement in relation to said frame, first and second pointers actuated by said actuating and pointer shafts respectively, a first spiral spring restraining movement between said shafts, and a second spiral spring exerting a predetermined suppressed minimum torque between said pointer shaft and said frame.

11. A resiliently-restrained instrument indicator comprising an angularly movable actuating shaft, a pointer shaft concentric with said actuating shaft, an instrument frame, bearing means supporting said shafts for relative angular movement and angular movement in relation to said frame, first and second pointers actuated by said actuating and pointer shafts respectively, a first spiral spring angularly restraining movement of said actuating shaft in relation to said pointer shaft, an actuating member mounted for angular movement with said actuating shaft, stop means mounted for angular movement with said pointer shaft, said actuating member and stop means being disposed to engage when said actuating shaft moves through a predetermined angle from a given orientation, a second spiral spring angularly restraining movement of said pointer shaft in relation to said frame, and a stationary stop member mounted in a fixed relationship with said frame, said stationary stop member and said pointer shaft stop means being disposed to engage and being urged into an abutting relationship by a predetermined suppressed minimum torque exerted by said second spiral spring.

12. A resiliently-restrained instrument indicator as set forth in claim 11 further comprising a circular dial fixed with said frame and concentric with said pointer and actuating shafts, circular scale indicia on said dial cooperating with said first and second pointers, said scale comprising lower and upper scale arcs each having different uniformly-distributed indicia, said second pointer being urged to the position dividing said scale arcs by said second spring, and means for angularly adjusting and fixing the position of said stationary stop member in relation to said frame.

References Cited in the file of this patent
UNITED STATES PATENTS

| | | |
|---|---|---|
| 2,433,541 | Bevins | Dec. 30, 1947 |
| 2,619,933 | Gordon | Dec. 2, 1952 |